March 11, 1952     J. BRODECK     2,589,044
COLLAPSIBLE SHOPPING CART
Filed Feb. 8, 1950     2 SHEETS—SHEET 1
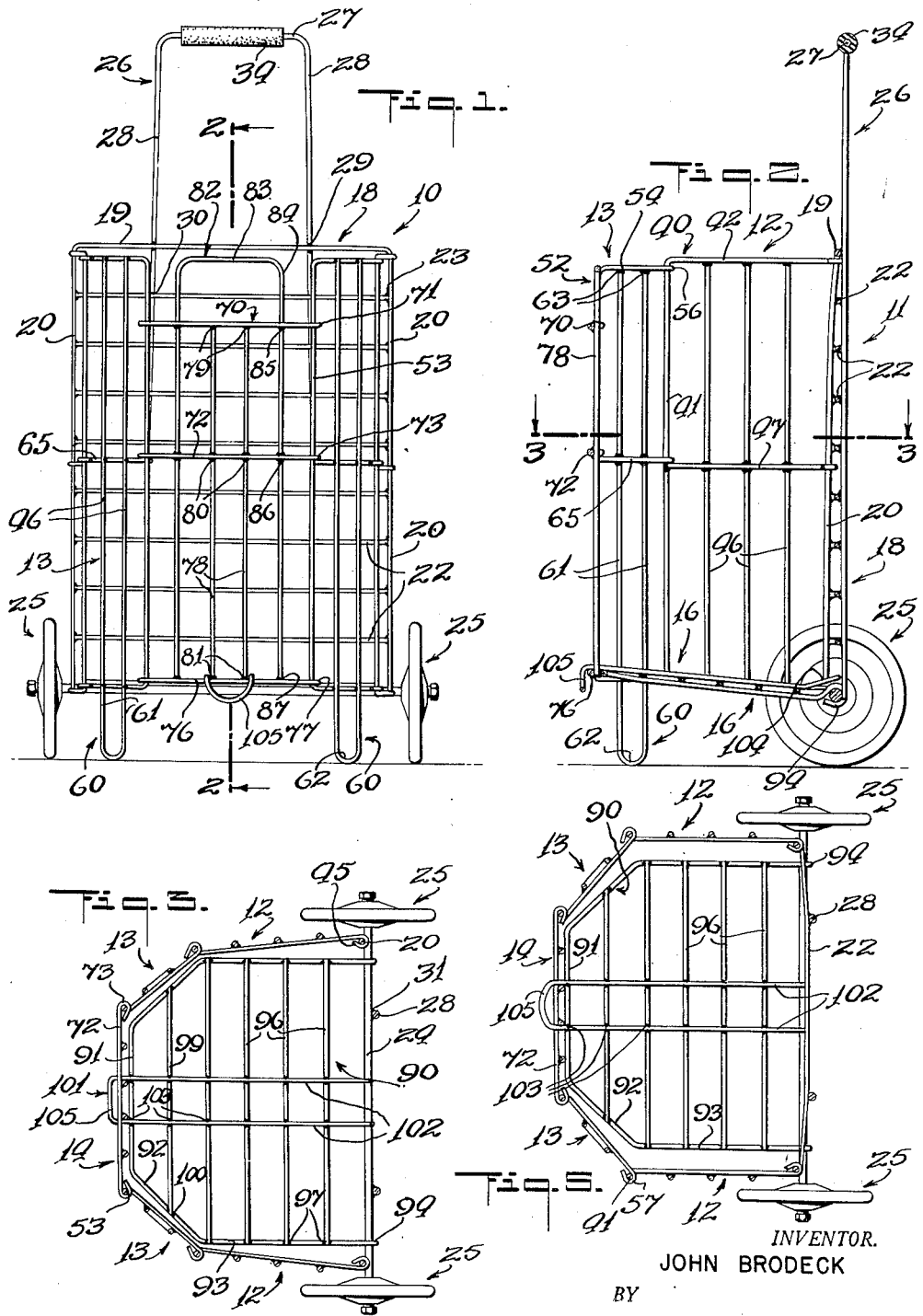
INVENTOR.
JOHN BRODECK
BY
J. B. Felshin
ATTORNEY March 11, 1952     J. BRODECK     2,589,044
COLLAPSIBLE SHOPPING CART
Filed Feb. 8, 1950     2 SHEETS—SHEET 2
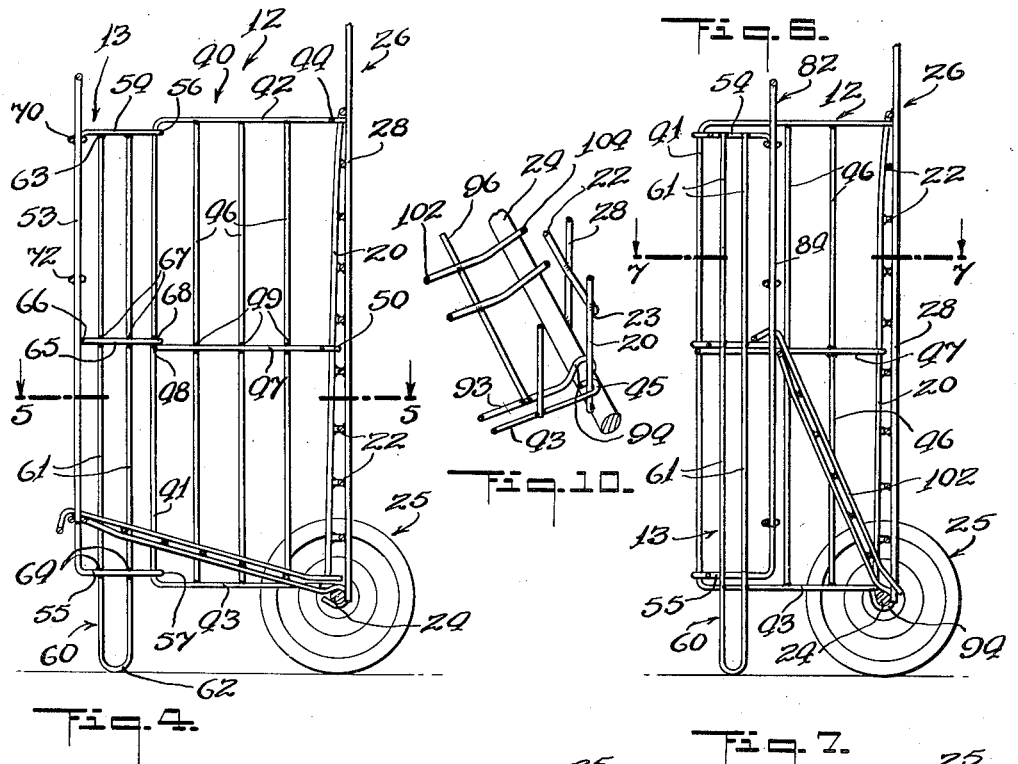
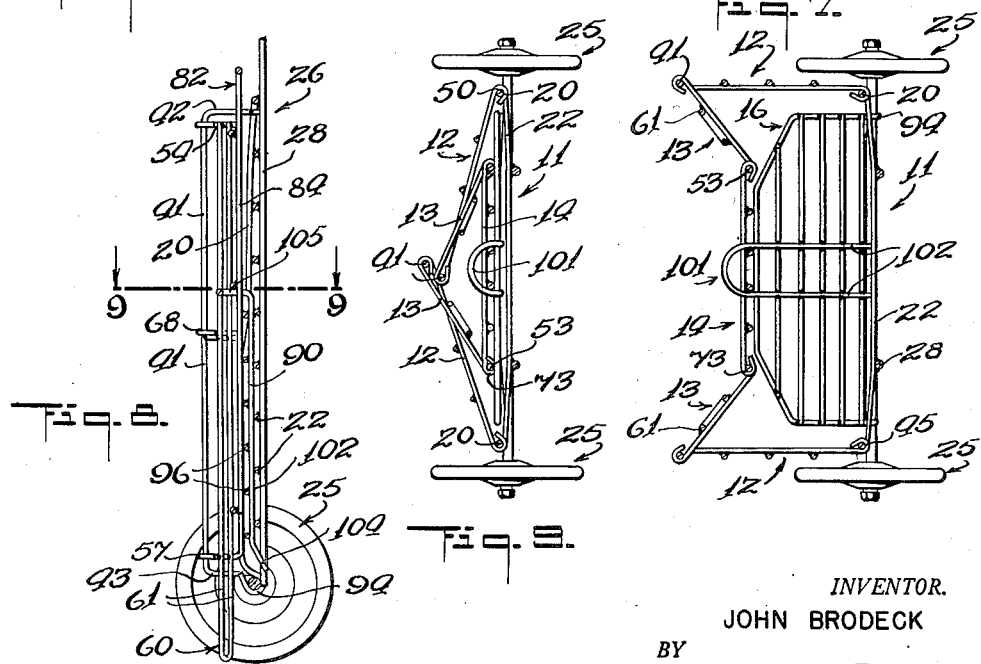
INVENTOR.
JOHN BRODECK
BY
J.B. Felshin
ATTORNEY Patented Mar. 11, 1952

2,589,044

UNITED STATES PATENT OFFICE 2,589,044

COLLAPSIBLE SHOPPING CART

John Brodeck, West New York, N. J.

Application February 8, 1950, Serial No. 143,109

8 Claims. (Cl. 280—36)

This invention relates to collapsible shopping carts. It is particularly directed to a collapsible shopping car such as is used by the housewife to bring back purchases from the grocery and butcher shops and the like.

One object of this invention is to generally improve a shopping cart such as is disclosed in U. S. Patent No. 2,483,958 issued to W. Yaszay et al. The shopping cart disclosed in said Patent No. 2,483,958 comprises a back section, to the lower end of which is attached an axle, carrying wheels and provided with a handle at its upper end, rear side sections hinged at their rear ends to the sides of the back section, a pair of symmetrically inclined front side sections hinged at their outer ends to the front ends of the rear side sections, a front section hinged at its sides to the front ends of the said inclined sections, and a bottom section hinged at its rear end about the axis of the axle, whereby said bottom section may be swung upwardly against the inner side of the back section and said rear side sections may be swung inwardly, and said inclined sections swung against the inner sides of said rear side sections, bringing the front section towards the back section.

In said patent however, the bottom section had to be raised, and means were provided engaging the front section to cause the front section to move towards the back section, as the bottom section is raised, thereby causing the inclined sections to swing against the inner sides of the rear side sections, and to cause said rear side sections to swing inwardly towards the back section.

Other shopping carts have been known which are provided with a bottom section which is swingable upwardly to initiate the collapsing of the shopping cart basket and in which the bottom section may be swung upwardly by depressing a foot pedal. All such prior shopping carts have been difficult to operate because of the necessity for depressing the foot pedal or otherwise requiring bending of the body for swinging the bottom section upwardly to initiate the collapsing of the shopping cart basket.

It is therefore an object of the present invention to provide a highly improved shopping cart of the character described eliminating the above difficulties, the same comprising a back section, rear side sections hinged to the back section, forwardly and inwardly inclined front side sections hinged to the forward ends of the rear side sections, a front section which is hinged to the front ends of the inclined sections and slidable upwardly relative thereto, and a bottom section hinged at its rear end to the lower end of the back section, and means at the front end of the bottom section slidably engaging the front section, the arrangement being such that in order to collapse the basket it is merely necessary to raise the front section thereby initiating the upwardly swinging movement of the bottom section, and said front section then being movable toward the rear section to cause the bottom section to continue swinging upwardly towards the rear section and causing the inclined sections to swing inwardly against the inner sides of the rear side sections and causing the rear side sections to swing inwardly toward the back section. With such construction in order to open up the shopping basket from its collapsed state it is merely necessary to grasp the upper end of the raised front section and to push the front section outwardly thereby causing the rear side sections, inclined front side sections and bottom section to move back towards the opened up or set up condition of the basket. Thus, with the shopping cart embodying the present invention, opening and closing of the basket is effected from the top with the use of the hand, and it is not necessary to depress any foot pedals or to work any part of the shopping cart at its lower end. In other words, the opening and closing movement of the shopping cart may be made simply while the user is standing up and the user does not have to bend down to operate the shopping cart.

Still another object of this invention is to provide a compact, strong and durable shopping cart of the character described which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which are shown various illustrative embodiments of this invention, Fig. 1 is a front elevational view of the shopping cart in set up or opened up condition;

Fig. 2 is a cross-sectional view taken on line 2—2 of Fig. 1;

Fig. 3 is a cross-sectional view taken on line 3—3 of Fig. 2;

Fig. 4 is a view similar to Fig. 2 but showing the front section raised;

Fig. 5 is a cross-sectional view taken on line 5—5 of Fig. 4;

Fig. 6 is a view similar to Fig. 4 but showing the raised front section pushed partially toward the rear or back section;

Fig. 7 is a cross-sectional view taken on line 7—7 of Fig. 6;

Fig. 8 is a view similar to Fig. 6 but showing the front section pushed fully toward the back section;

Fig. 9 is a cross-sectional view taken in line 9—9 of Fig. 8; and

Fig. 10 is a partial perspective view illustrating the attachment of the bottom section to the axle and the hingeing of one of the side sections to the back section.

Referring now in detail to the drawing, 10 designates a shopping cart embodying the invention. The same is comprised generally of a back section 11, a pair of similar, symmetrically disposed rear side sections 12 hinged to the back section, a pair of similar, symmetrically disposed inclined front side sections 13 hinged to the rear side sections, a front section 14 hinged to the front ends of the inclined sections 13 and slidable relative thereto, and a bottom section 16 hinged at its rear end, to the lower end of the back section 11.

The back section 11 comprises a U shaped wire 18 comprising a top portion 19 from the outer ends of which extend downwardly side portions 20. Interconnecting the side portions 20 are a plurality of horizontal cross wires 22. The ends of the cross wires 22 may be welded or otherwise secured to the side portions 20 as at 23. Welded to the lower ends of the side portions 20 of U shaped member 18 is an axle 24. The axle 24 has portions extending beyond said side members 20 and mounted on said extensions are wheels 25, of usual construction.

Attached to the rear of section 11 is a handle member 26. Said handle member 26 comprises a U shaped member of wire stock, heavier than the wires of which the members 18 and 22 are made. Member 26 comprises a top portion 27 and portions 28 extending downwardly from the ends of the top portion. Said portions 28 are welded to portions 19 and cross wires 22 as at 29 and 30 respectively, where said portions 28 cross portion 19 and cross wires 22. Also, the lower ends of said portions 28 are welded to the axle 24 as at 31. Member 26 is located in back of the back section 11. The side portions 28 of said member 26 may be tapered upwardly and inwardly somewhat and extend above the upper end of the back section 11. Thus the portion 27 is located well above the back section and constitutes a handle which may be grasped by the operator for moving the shopping cart. A rubber tube 34 may be received on the portion 27 to facilitate handling of the cart.

Each of the rear side sections 12 comprises a U shaped member 40 having a front vertical portion 41 from which extend rearwardly top and bottom arms 42 and 43, respectively. At the rear end of the top arm 42 is looped portion 44 bent around portion 20 just below portion 19 of member 18. At the rear end of the arm 43 is looped portion 45 looped around portion 20 just above the axle 24. In fact the looped portion 45 rests on the axle 24. The top and bottom portions 42 and 43 are interconnected by vertical parallel wires 46 welded at their upper and lower ends to the wires 42 and 43 respectively. The midpoints of portion 41 and wires 46 of each side section 12 are interconnected by a horizontal brace wire 47 welded as at 48, to said portion 41 and as at 49 to the vertical wires 46. At the rear end of brace wire 47 is a loop 50 encircling portion 20 of U shaped member 18. It will now be understood that each of the rear side sections 12 are hinged to the sides of the back section and may be swung inwardly toward the front of the back section.

Each of the inclined front side sections 13 comprises a U shaped member 52 having a vertical portion 53 and horizontal upper and lower arms 54 and 55 extending therefrom. The arms 54 and 55 are formed with upper and lower loops 56 and 57 respectively, encircling the portion 41 of member 40 just below and just above the arms 42 and 43 respectively. Attached to the upper and lower arms 54 and 55 of each member 53 is a bent back U shaped wire member 60 having vertical portions 61 interconnected at the bottom by a curved portion 62. The upper ends of portion 61 terminate at the upper arm 54 and are welded thereto as at 63. Wires 61 are welded to the arm 55 where they cross said arm as at 64. The arms 61 extend below arm 55 and the curved portion 62 is substantially on a horizontal level with the bottom of the wheels 25, whereby to support the opened up shopping cart in a substantially vertical condition.

Portion 53 and arms 61 of each section 13 are interconnected by a horizontal cross brace wire 65 welded at its front end as at 66 to substantially the mid-portion of arm 53 and as at 67 to the arm 61. At the rear end of each member 65 is a loop 68 encircling portion 41 of member 40 and just above member 47. It will now be understood that the sections 13 are swingable about the axis of portions 41 inwardly toward the inner sides of the rear side sections 12.

The front section 14 comprises a top horizontal wire 70 formed with loops 71 at its outer ends encircling the portions 53 of the sections 13. Wire 70 is located well below the upper ends of said sections 13, preferably between two and two and one-half inches below. Said front section 14 further comprises a horizontal wire 72 provided with loops 73 at its outer ends encircling said portions 53 of the sections 13 and resting on the brace wires 65. The front section 14 further comprises a bottom horizontal wire 76 provided with loops 77 at its ends encircling the side portions 53 and sections 13 and resting upon the lower arms 55.

The wires 70, 72 and 76 are interconnected by a pair of parallel vertical wires 78 welded as at 79, 80 and 81 to the wires 70, 72 and 76 respectively. Said wires 70, 72 and 76 are further interconnected by a U shaped member 82 comprising a top portion 83 from which extend downwardly parallel vertical portions 84 welded to said wires 70, 72 and 76 as at 85, 86 and 87 respectively. It will now be understood that the section 14 is hinged to the front ends of sections 13 and is slidable vertically relative thereto. Portion 83 of member 82 constitutes a handle which may be grasped by the housewife or user of the cart, and pulled up to slide said front section 14 upwardly until the loops 71 contact the arms 54 of members 52. Such position is shown in Fig. 4 of the drawing.

The bottom section 16 comprises a wire member 90 having a front portion 91 which in the opened up position of the basket lies along side the wire 76, but terminates short of the wire 76 at opposite ends. Extending from the portion 91 of member 90 are outwardly and rearwardly inclined portions 92 which lie along side of the bottom arms 55 of members 52 and extending rearwardly from portions 92 are portions 93 parallel to one another and extending rearwardly and provided at their rear ends with loops 94 encircling the axle 24. The side portions 93 are interconnected by horizontal wires 96 extending from side to side and welded at their ends as at 97 to said side portions. The portions 92 are interconnected by wire 99 parallel to the wires 96 and welded at its ends to said portion 92 as at 100. Attached to the wires 96 and 99 is a member 101 comprising parallel portions 102 crossing and welded to portions 91, 99 and 96 as at 103. The rear ends of portions 102 are bent upwardly as at 104 overlying the axle. The portions 102 of member 101 extend inwardly on opposite sides of the vertical wires 78 and the portions of the wires 102 which pass beyond the front section 14 are interconnected by a downwardly extending curved or U shaped portion 105 which extends downwardly below and in front of wire 76. Thus the lower ends of wires 78 are received between the wires 102. It will be noted that the bottom section 16 is disposed within the bottom of the basket formed by back section 11, rear side sections 12, inclined front sections 13 and front section 14, and that it is hinged to the axle 24 at the lower end of the back section, and that in the set up condition of the basket the front end of the bottom section rests on the wire 76 of the front section. Furthermore, it will be understood that the bottom section 16 may be swung upwardly toward the inner side of the back section, but when such is done the front ends of the wires 102 will slide upwardly relative to the front section and the front section will also be carried toward the rear section.

In Figs. 1, 2 and 3 the shopping cart is shown in open or set up condition. It is supported on the wheels 25 and on the lower ends of member 60 thereby being retained in a vertical position. The handle 34 may be grasped and the cart tilted rearwardly for pulling or pushing the cart on its wheels. In order to collapse the cart it is merely necessary to grasp handle portion 83 of member 82 of the front section and pull up, thereby raising the front section from the position shown in Fig. 1 to the position shown in Fig. 4. Such action will cause the bottom section 16 to be raised up somewhat to the position of Fig. 4 and the front section will be thereby moved slightly towards the rear section, thereby causing the inclined front sections 13 to be swung from the position shown in Fig. 3 to the position shown in Fig. 5, thereby swinging the rear side sections 12 somewhat outwardly. After the front section 14 is fully lifted to the point where the loop 71 contacts the arms 42 of members 40 said front section is then pulled by the operator toward the back section, thereby causing complete collapse of the basket. The basket will first be collapsed from the position of Figs. 4 and 5 to the position of Figs. 6 and 7, the front section moving closer toward the back section, the rear side sections 12 swinging first outwardly and then inwardly and the inclined front sections 13 swinging about their outer ends toward the inner sides of the rear side sections 12. During this operation the bottom section 16 is swung upwardly and the front ends of the wires 102 move upwardly away from wire 76, but portion 105 engaging the wires 76 continues to be raised or swung upwardly about its rear end toward the inner side of the back section. As the motion is continued the basket is collapsed from the position of Figs. 6 and 7 to the fully collapsed position of Figs. 8 and 9. In that fully collapsed position the bottom section 16 is swung fully toward the back section, the front section is folded against the underside of the raised bottom section, the inclined front sections are swung toward the front surface of the front section and against the inner sides of the rear side sections, and the rear side sections are swung inwardly toward each other as far as possible.

The cart is thus collapsed and may be stored or placed in a compact place.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A collapsible shopping cart comprising a back section, an axle at the lower end of the back section, wheels carried by the axle, a handle attached to the back section and extending upwardly therefrom, side sections hinged at their rear ends to the sides of the back section, sections hinged at their rear ends to the front ends of the side sections, a front section hinged to and slidably engaging the front ends of said last mentioned sections, and a bottom section hinged at its rear end to the axle and having means to slidably and non-detachably engage the front section.

2. In a shopping cart comprising a back section supported on wheels, a pair of rear side sections hinged at their rear ends to the back section, a pair of front side sections hinged at their rear ends to the front ends of the rear side sections, a front section hinged at its sides to the front end of the front side sections, said front section being slidable relative to the front side sections, means to limit the sliding movement of the front section from a down position to an up position, a bottom section hinged to the rear end of the back section, means on the front section to support the bottom section in horizontal position in the down position of said front section, and to cause the bottom section to be swung upwardly toward the rear section upon raising the front section from a down to an up position and then moving the front section from the up position rearwardly toward the rear section.

3. A shopping cart comprising a back section, an axle at the lower end of the back section, wheels carried by the axle, a handle at the upper end of the back section, a pair of rear side sections hinged at their rear ends to the sides of the back section, a pair of front side sections hinged at their rear ends to the front ends of the rear side sections, said front side sections having at their front ends vertical portions, and a front section having means at its sides slidably and pivotally engaging said vertical portions, and a bottom section hinged at its rear end to the lower end of the back section, said front section having a bottom portion and a central vertical portion extending upwardly from the bottom portion, and said bottom section having portions extending from the front section and resting on the bottom portion and slidably engaging said central vertical portion, whereby said shopping cart may be collapsed by sliding said front section upwardly and moving it towards said back section.

4. A shopping cart comprising a back section, an axle at the lower end of the back section, wheels carried by the axle, a handle at the upper end of the back section, a pair of rear side sections hinged at their rear ends to the sides of the back section, a pair of front side sections hinged at their rear ends to the front ends of the rear side sections, said front side sections having at their front ends vertical portions, and a front section having means at its sides slidably and pivotally engaging said vertical portions, and a bottom section hinged at its rear end to the lower end of the back section, said front section having a bottom portion and a central vertical portion extending upwardly from the bottom portion, and said bottom section having portions extending from the front section and resting on the bottom portion and slidably engaging said central vertical portion, whereby said shopping cart may be collapsed by sliding said front section upwardly and moving it towards said back section, means to limit the downward movement of the front section relative to the front side sections and means to limit the upward sliding movement of the front section relative to said front side sections.

5. A shopping cart comprising a back section, an axle at the lower end of the back section, wheels carried by the axle, a handle at the upper end of the back section, a pair of rear side sections hinged at their rear ends to the sides of the back section, a pair of front side sections hinged at their rear ends to the front ends of the rear side sections, said front side sections having at their front ends vertical portions, and a front section having means at its sides slidably and pivotally engaging said vertical portions, and a bottom section hinged at its rear end to the lower end of the back section, said front section having a bottom portion and a central vertical portion extending upwardly from the bottom portion, and said bottom section having portions extending from the front section and resting on the bottom portion and slidably engaging said central vertical portion, means to limit the downward movement of the front section relative to the front side sections and means to limit the upward sliding movement of the front section relative to said front side sections, and a central handle on the front section and extending upwardly therefrom.

6. A shopping cart comprising a back section, an axle at the lower end of the back section, wheels carried by the axle, a handle at the upper end of the back section, a pair of rear side sections hinged at their rear ends to the sides of the back section, a pair of front side sections hinged at their rear ends to the front ends of the rear side sections, said front side sections having at their front ends vertical portions, and a front section having means at its sides slidably and pivotally engaging said vertical portions, and a bottom section hinged at its rear end to the lower end of the back section, said front section having a bottom portion and a central vertical portion extending upwardly from the bottom portion, and said bottom section having portions extending from the front section and resting on the bottom portion and slidably engaging said central vertical portion, means to limit the downward movement of the front section relative to the front side sections and means to limit the upward sliding movement of the front section relative to said front side sections, and a central handle on the front section and extending upwardly therefrom, and means on the front side sections extending downwardly therefrom to substantially the level of the bottom of the wheels, whereby to support the shopping basket in vertical position.

7. A shopping cart comprising a back section, an axle at the lower end of the back section, wheels carried by the axle, a handle extending upwardly from the back section, a pair of rear side sections hinged at their rear ends to the sides of the back section, a pair of front side sections hinged at their rear ends to the front ends of the rear side sections, said front side sections each comprising a front vertical member, top and bottom arms extending from the upper and lower ends respectively of the front member, and an intermediate brace connected to an intermediate portion of the front member, and a front section comprising parallel vertical portions, and a horizontal portion at the lower end of said vertical portions and having loops at the ends thereof slidably engaging the vertical members of the front side sections just above the lower arms, and a second horizontal portion attached to said vertical portions and having loops at the ends thereof slidably engaging said vertical members of the front side sections just above said intermediate members, and a top horizontal portion attached to said parallel vertical portions and having loops at the ends thereof slidably engaging said vertical members below the top arms of said front side sections, and a bottom section hinged at its rear end to the axle and comprising a pair of parallel horizontal members projecting through the front section and receiving said vertical portions therebetween, and means interconnecting said parallel horizontal members of the bottom section in front of the front section.

8. A shopping cart comprising a back section, an axle at the lower end of the back section, wheels carried by the axle, a handle extending upwardly from the back section, a pair of rear side sections hinged at their rear ends to the sides of the back section, a pair of front side sections hinged at their rear ends to the front ends of the rear side sections, said front side sections each comprising a front vertical member, top and bottom arms extending from the upper and lower ends respectively of the front member, and an intermediate brace connected to an intermediate portion of the front member, and a front section comprising parallel vertical portions, and a horizontal portion at the lower end of said vertical portions and having loops at the ends thereof slidably engaging the vertical members of the front side sections just above the lower arms, and a second horizontal portion attached to said vertical portions and having loops at the ends thereof slidably engaging said vertical members of the front side sections just above said intermediate members, and a top horizontal portion attached to said parallel vertical portions and having loops at the ends thereof slidably engaging said vertical members below the top arms of said front side sections, and a bottom section hinged at its rear end to the axle and comprising a pair of parallel horizontal members projecting through the front section and receiving said vertical portions therebetween, and means interconnecting said parallel horizontal members of the bottom section in front of the front section, and a handle at the upper end of the front section.

JOHN BRODECK.

REFERENCES CITED

The following references are of record in the file of this patent:

UNITED STATES PATENTS

| Number | Name | Date |
|---|---|---|
| 2,483,958 | Yaszay et al. | Oct. 4, 1949 |